United States Patent [19]
Schneider et al.

[11] Patent Number: 5,999,547
[45] Date of Patent: Dec. 7, 1999

[54] TUNABLE OPTICAL PARAMETRIC OSCILLATOR

[75] Inventors: Klaus Schneider; Stephan Schiller, both of Constance; Jürgen Mlynek, Radolfzell-Güttingen; Patrick Kramper, Constance, all of Germany

[73] Assignee: Universität Constance, Konstance, Germany

[21] Appl. No.: 09/017,964

[22] Filed: Feb. 2, 1998

[30] Foreign Application Priority Data

| Feb. 7, 1997 | [DE] | Germany | 197 06 031 |
| Apr. 30, 1997 | [DE] | Germany | 197 18 254 |
| Nov. 19, 1997 | [DE] | Germany | 197 51 324 |

[51] Int. Cl.$^6$ .............................. G02F 1/39; H01S 3/108
[52] U.S. Cl. ............................................. 372/21; 359/330
[58] Field of Search ..................... 372/21, 22; 359/326, 359/328, 330

[56] References Cited

U.S. PATENT DOCUMENTS

| 3,644,845 | 2/1972 | Harris ................................. 359/330 X |
| 5,134,622 | 7/1992 | Deacon .................................. 372/21 |
| 5,233,462 | 8/1993 | Wong .................................... 359/330 |
| 5,289,491 | 2/1994 | Dixon .................................. 372/21 X |
| 5,640,405 | 6/1997 | Wallace et al. ......................... 372/21 |
| 5,796,513 | 8/1998 | Stamm et al. ......................... 359/330 |

OTHER PUBLICATIONS

Continuous–wave singly resonant optical parametric . . . May 15, 1996/vol. 21 No. 10/Optics Letters pp. 713–715 Bosenberg W R et al.

Yang S T et al. "1.9–W CW Ring–Cavitiy KTP singly resonant optical parametric oscillator"Optic Letters, vol. 19, No. 7, Apr. 1, 1994, pp. 475–477.

Breitenbach G et al. "81% conversion efficiency . . . ", Journal of the optical society of America B (Optical Physics), Nov. 1995, USA, vol. 12, No. 11, pp. 2095–2101.

Schiller et al., "Subharmonic–Pumped continuous–wave Parametric Oscillator" applied Physics Letters, vol.68, No. 24, Jun. 10, 1996 pp. 3374–3376.

*Primary Examiner*—John D. Lee
*Attorney, Agent, or Firm*—Paul Vincent

[57] ABSTRACT

An optical parameter oscillator system is proposed for use in a continuous wave pump laser system having a single-frequency pump source. The system comprises a single-resonance resonator having a nonlinear medium to produce a first and second parametrically generated wave in response to the pump wave from the single-frequency pump source. The system includes means for controlling the cavity length of the resonator, means for controlling the pump frequency of the pump source and means for controlling the temperature of the nonlinear medium. The system provides for a reliable singly-resonant optical parametric oscillator capable of emitting laser light with high spectral purity and frequency stability over a wide spectral range and is resistant to mode hopping.

20 Claims, 3 Drawing Sheets

TUNABLE OPTICAL PARAMETRIC OSCILLATOR

This application claims Paris convention priority of German patent applications 19706031.5 filed Feb. 7, 1997, 19718254.2 filed Apr. 30, 1997 and 197 51 324.7 filed Nov. 19, 1997 the complete disclosures of which are hereby incorporated by reference.

BACKGROUND OF THE INVENTION

The invention concerns a compact and reliable singly-resonant optical parametric oscillator (SRO) capable of emitting laser light of high spectral purity and frequency stability over a wide spectral range.

An optical parametric oscillator (OPO) is a nonlinear device which converts incident photons into photon pairs when optically excited at a power per unit area above a certain threshold. The threshold level is a characteristic of the non-linear material, the resonator, and is a function of wavelength. This device is usually embodied in one of two forms: Either a doubly-resonant oscillator (DRO) in which both the generated optical beams are resonated or in a singly-resonant oscillator mode (SRO) in which only one of the generated optical beams is in resonance.

Use of optical parametric oscillators for commercial and scientific applications requires simultaneous achievement of several requirements. In particular, widely tunable laser radiation having high frequency stability and narrow linewidth is usable for a plurality of applications in the field of high-resolution spectroscopy and metrology. Continuous-wave operation of such laser sources is required to achieve linewidths on the order of one Mega Hertz or less. A plurality of continuous-wave lasers are available for different portions of the optical spectrum e.g. laser diodes in the 630–2000 nanometer range, titanium-sapphire lasers in the 710–1100 nanometer range, dye lasers in the 400–800 nm range and color center lasers in the 2–3.5 μm spectral regions. However, these lasers fail to simultaneously satisfy the following criteria:

Large emission range (in excess of 100 nm);
High power (in excess of 50 mW);
Narrow linewidth (less than 1 Mega Hertz);
Good frequency stability (drift less than 200 MHz/h); and compact size.

In principle, nonlinear optical frequency conversion can be used to extend the wavelength range of lasers having the desired properties. In combination with solid-state lasers, such as diode-pumped Nd:YAG lasers, pulsed nonlinear frequency conversion has been demonstrated to be capable of generating light in the ultraviolet, visible and infrared spectral regions in compact, powerful, and reliable systems. Research on continuous-wave optical parametric oscillators (OPOs) driven by diode-pumped solid state lasers had been started in 1989 by Kozlovsky et al. (Optics Letters 14, 66 (1989)) using a doubly-resonant OPO (DRO) with both generated waves being resonantly enhanced to reduce the oscillator threshold. Although emission ranges of more than 200 nm in the near infrared region and output powers in the mW range had been demonstrated (Gerstenberger et al., J. Opt. Soc. Am. B 10, 1681 (1993)), the high susceptibility of DROs to mode-hopping and the difficult tuning behavior (Eckardt et al., J. Opt. Soc. Am. B 8, 646 (1991)) have caused continuous-wave OPOs to achieve the reputation of being non-suitable for high-resolution spectroscopy applications. Yang et al. (Optics Letters 18, 971 (1993)) have shown that a singly-resonant OPO (SRO) can achieve mode-hop-free operation over several minutes and a continuous tuning range of 550 MHz has been obtained. These achievements of prior art are still far from the practical demands of high-resolution spectroscopy applications.

In view of these disadvantages of prior art, it is the principal purpose of the present invention to further improve a singly-resonant oscillator of the above mentioned kind in such a fashion that frequency-stable and mode-hop-free operation with continuous frequency tuning is achieved in an efficient, compact, stable and widely tunable nonlinear frequency conversion system.

SUMMARY OF THE INVENTION

This purpose is achieved in accordance with the invention in an optical parametric oscillator system for use in a continuous-wave pumped laser device having a single-frequency pump source. The system comprises a singly-resonant cavity having a nonlinear medium for producing a first parametrically generated wave (signal wave) and a second parametrically generated wave (idler wave) in response to a pump wave from the single-frequency pump source, with means for controlling parameters that lead to changes in wavevector mismatch such as the optical path length of the resonator, the frequency of the pump source, and the temperature of the nonlinear medium.

In accordance with the invention it has been found that certain stability requirements are essential to the elimination of mode-hops. In particular, the essential parameters of the system, i.e. typically the pump frequency, cavity optical path length (determined in turn by the crystal temperature and physical length of the cavity) must not change more than a predetermined amount. The allowable amount depends on the cavity design and dimension, the nonlinear material used and the pump and the emission wavelengths. To prevent mode-hops, a sufficient criterion is that the allowable fluctuations must be significantly less than those that would lead to a situation where the wavevector mismatch for oscillation with the frequency of the resonantly parametrically generated wave differing by one free spectral range of the cavity yields a larger gain.

Viewing the change in pump angular frequency $\delta\omega_p$, the change in resonator medium temperature $\delta T$ and the change in cavity length $\delta L$, as independent variations leads to the following sufficient conditions for mode-hop free operation $$|\delta\omega_p| \ll \frac{\omega_{fsr}}{2} \frac{\tilde{n}(\omega_i) - \tilde{n}(\omega_s)}{\tilde{n}(\omega_p) - \tilde{n}(\omega_i) + (\tilde{n}(\omega_i) - \tilde{n}(\omega_s))\frac{\partial \omega_s}{\partial \omega_p} + \left[\frac{\partial n}{\partial T}\bigg|_{\omega_p}\omega_p - \frac{\partial n}{\partial T}\bigg|_{\omega_s}\omega_s - \frac{\partial n}{\partial T}\bigg|_{\omega_i}\omega_i\right]\frac{\partial T}{\partial \omega_p}} \quad (1)$$

$$|\delta T| \ll \frac{\omega_{fsr}}{2} \frac{\tilde{n}(\omega_i) - \tilde{n}(\omega_s)}{(\tilde{n}(\omega_i) - \tilde{n}(\omega_s))\frac{\partial \omega_s}{\partial T} + (\tilde{n}(\omega_p) - \tilde{n}(\omega_i))\frac{\partial \omega_p}{\partial T} + \frac{\partial n}{\partial T}\bigg|_{\omega_p}\omega_p - \frac{\partial n}{\partial T}\bigg|_{\omega_s}\omega_s - \frac{\partial n}{\partial T}\bigg|_{\omega_i}\omega_i}$$

$$|\delta L| \ll \frac{\omega_{fsr}}{2} \frac{\tilde{n}(\omega_i) - \tilde{n}(\omega_s)}{(\tilde{n}(\omega_i) - \tilde{n}(\omega_s))\frac{\partial \omega_s}{\partial L} + (\tilde{n}(\omega_p) - \tilde{n}(\omega_i))\frac{\partial \omega_p}{\partial L}}$$

with $\tilde{n}(\omega_x) := n(\omega_x) + \frac{\partial n}{\partial \omega}\bigg|_x \omega_x$ -continued $$\text{and } \omega_{fsr} = \frac{2\pi c}{n(\omega_s)L_{rt}^c + L_{rt}^a}$$

and $L_{rt}^c$ is the round-trip of the crystal, $L_{rt}^a$ is the round-trip length in air.

These equations apply to all different kinds of SRO configurations. To specialize these equations to a particular case, only those equations in (1) are taken where the variation on the left hand side refers to an independent parameter, and the partial derivatives $$\frac{\partial \omega_s}{\partial \omega_p}, \frac{\partial \omega_s}{\partial T}, \frac{\partial \omega_s}{\partial L}, \frac{\partial \omega_p}{\partial T}, \text{ and } \frac{\partial \omega_p}{\partial L},$$

where they are nonzero, are calculated using the corresponding resonance conditions and inserted into equations (1). To illustrate this procedure, the case of the signal-resonant OPO with non-resonant pump ($\omega_p$,L,T are the independent parameters) leads to the following:

$$\left(\frac{\partial \omega_s}{\partial L}\right)_{T,\omega_p} = -\frac{\omega_s}{\tilde{n}(\omega_s)L_{rt}^c + L_{rt}^a} \quad (2)$$

$$\left(\frac{\partial \omega_s}{\partial L}\right)_{L,\omega_p} = -\omega_s \frac{n(\omega_s)\frac{\partial L_{rt}^c}{\partial T} + \frac{\partial n}{\partial T}\bigg|_{\omega_s L_{rt}^c}}{\tilde{n}(\omega_s)L_{rt}^c + L_{rt}^a}$$

wherein all other partial derivatives vanish.

These results can be generalized to include electro-optic tuning of the resonator optical path length.

In applications in which it is desirable to tune the frequency of the signal or idler wave of the SRO over a large range, tuning of the output waves can be performed by changing the optical path length of the cavity to thereby change the resonance frequency. The frequency of the conjugate non-resonant wave is thereby changed indirectly through the condition of photon energy conservation. If the optical path length is changed by a substantial amount, a phase mismatch in the parametrical interaction causing a mode-hop will occur. In order to prevent this, the system in accordance with the invention includes means to change the indices of refraction of at least one of the waves involved in a parametric interaction (typically via a change in temperature applied to the nonlinear optical crystal, although a change in an applied electric field would also be possible). This change in phase mismatch is chosen to compensate or nearly compensate for the phase mismatch which occurs due to frequency tuning of the OPO output waves. In particular, a servo system can be employed to regulate this phase mismatch such that the emitted idler or signal wave power is maximized. An error signal for this regulation can be obtained by applying a small positive and negative temperature change to the crystal and comparing the emitted OPO powers.

For frequency-stable operation of the OPO output waves, the frequency output of the singly-resonant OPO for the generated and emitted waves is determined by the optical path length of the cavity for the signal wave. For this reason, small changes in this length caused e.g. by mechanical disturbances, drifts in temperature of the nonlinear crystal to change its index of refraction, pressure fluctuations of the air and the like, cause frequency changes in the signal and for a given pump frequency, in the idler frequency. The goal of an active frequency stabilization system for SRO must therefore be to reduce the frequency changes of the signal wave and/or the idler wave compared to the level of the free running device. In accordance with the invention, the combined means for controlling the cavity length of the resonator, means for controlling the pump frequency of the pump source, and means for controlling a temperature of the nonlinear medium provide the necessary conditions for frequency stable operation and suppressed mode-hopping.

In a preferred embodiment in accordance with the invention, the resonator comprises a monolithic block. This embodiment is particularly suited for maintaining the stability requirements mentioned above.

In another embodiment of the invention the nonlinear medium comprises a quasi-phase matched crystal. This embodiment provides a particular nonlinear medium for generating output waves at desired wavelengths.

In a further embodiment of the invention the cavity length controlling means comprise means for changing an optical path length of the resonator by a controlled amount. Additional means are provided for adjusting a phase matching efficiency of the resonator in response to a change in the cavity length to maximize the power conversion efficiency of the system. This embodiment has the advantage of permitting smooth tuning of the OPO frequencies over large ranges.

In a further advantageous embodiment, the system comprises a frequency-stable reference and means for comparing the frequency of one of the first and second parametrically generated beams with the frequency-stable reference. Comparison with the reference permits feedback control to tune the system for emission with stable frequency.

It is advantageous when the resonator has high transmission for the pump wave, and when an electro-optic medium is disposed within the resonator with means for applying an electric field to the medium, wherein the independent parameters comprise a pump frequency, a temperature of the nonlinear medium, the electric field, and a part of a round trip optical path length of the first parametrically generated wave external to the nonlinear medium. Electro-optic control of the optical path length permits fast tuning of the frequencies.

In an advantageous embodiment, the resonator comprises mirrors for the first and second parametrically generated and the pump waves, and the resonator has low loss for the pump wave, with the pump wave being resonantly enhanced between the mirrors, with means for maximizing a circulating pump power through control of the pump frequency. Resonating the pump wave reduces the pump laser power necessary to achieve threshold. Locking the pump wave to the resonator is advantageous if the pump laser has low frequency stability.

In an additional embodiment, the resonator comprises mirrors for the first and the second parametrically generated and the pump waves, the resonator has low loss for the pump wave and the pump wave is resonantly enhanced between the mirrors with means for detecting a detuning of the pump wave from resonance and means for controlling an optical path length of the resonator to maximize the circulating pump power. This embodiment is favourable because, in the case of a frequency-stable pump, some of the frequency-stability is transferred to the optical path length of the resonantly parametrically generated wave, leading to good frequency stability of both parametrically generated waves.

In various embodiments stabilization uses a probe wave as claimed. The general advantage of these techniques is that they can be employed to generate frequency-stable output with higher frequency-stability than that of the pump wave or to improve the frequency stability of the output in case of a non-resonant pump wave. Using the harmonic of the pump as a probe has the advantage that, for a widely tunable device, the mirrors need to have low loss for a probe wave of only a single wavelength. The advantage of using the second harmonic of the second parametrically generated wave (if it is the longer wavelength one) is that its wavelength can fall in the range of the wavelengths of the first wave, so that there is no need for low resonator loss at a wavelength not already covered.

If the probe is the polarization-rotated resonantly generated parametric wave, stabilization is achieved without requiring the resonator mirrors to have low loss at a wavelength not already covered and no additional nonlinear medium is necessary for frequency doubling.

In an additional preferred embodiment, the resonator consists essentially of a semi-monolithic resonator comprising a quasi-phase matched multigrating medium for second order nonlinear optical frequency conversion, an external concave mirror having a mirror coating on a curved surface thereof, and a mirror coating on one end face of the multigrating medium and the end face with the mirror is flat. This embodiment has the advantage of being particularly simple and provides for a simple tuning of the resonator system and particularly stable operation.

In a highly preferred embodiment, the resonator consists essentially of a Brewster angle cut resonator comprising at least one external concave mirror having a radius-of-curvature equal to a distance between an exit point out of a Brewster angle surface of the nonlinear medium and a curved reflecting surface of the external concave mirror, wherein the nonlinear medium has at least one Brewster angle surface to minimize Fresnel-reflection losses for waves having a polarization vector parallel to a plane of incidence, with waves of different wavelengths propagating colinearly within the nonlinear medium. This embodiment has the advantage of allowing for compensation of the dispersion of the different frequency beams exiting out of the Brewster angle cut and reflecting the beams such that they optimally overlap inside the nonlinear medium. A simple configuration is therefore achieved, wherein a focus element is provided within the nonlinear medium for stable resonator modes.

In an embodiment of this particular improvement, the focussing element consists essentially of a curved surface having a mirror coating.

In an alternative variation of this improvement, a curved surface having total internal reflection is utilized as a focussing element. This embodiment has the advantage of not requiring a mirror coating on the nonlinear medium.

Additional improvements and advantages of the invention can be derived from the accompanying drawings. The features which can be extracted from the claims and drawings can be used, in accordance with the invention, individually or collectively in arbitrary combination. The drawings have exemplary character only and are not to be considered exhaustive embodiments of inventive configurations.

DESCRIPTION OF THE PREFERRED EMBODIMENT

Figure 1:
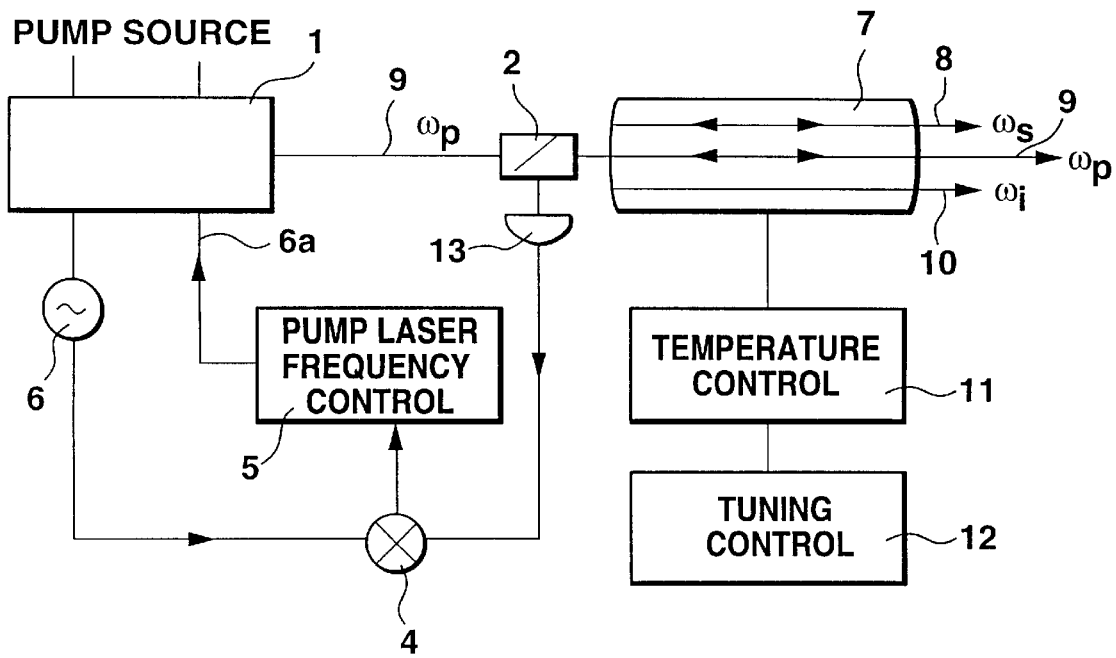
FIG. 1 shows an embodiment of the invention illustrating a pump-resonant SRO.

FIG. 1 shows a pump-resonant SRO system in accordance with the invention comprising a pump source 1 producing a pump wave 9. The pump wave 9 is incident on an optical isolator system 2, passes through same and enters into a monolithic singly-resonant oscillator (SRO) 7. The singly-resonant oscillator 7 produces a signal wave 8 as well as a idler wave 10. The pump wave resonates in the SRO cavity. A portion of the pump wave 9 reflects back into isolator 2 and is sent to detector 13. An amplitude modulation signal due to detuning of the pump frequency from resonance is demodulated using a mixer 4 and a local oscillator 6 that also phase-modulates the pump wave 9. After filtering and amplification a correction signal 6a is fed into the pump source 1 for regulation of its frequency on resonance with the SRO 7.

The SRO 7 of FIG. 1 is coupled to temperature control means 11 as well as tuning control means 12 to stabilize the temperature of the SRO and its optical path length to a level where mode-hops are suppressed. Frequency-tuning of wave 8 and 9 is achieved by changing the medium temperature by a controlled amount.

Figure 2:
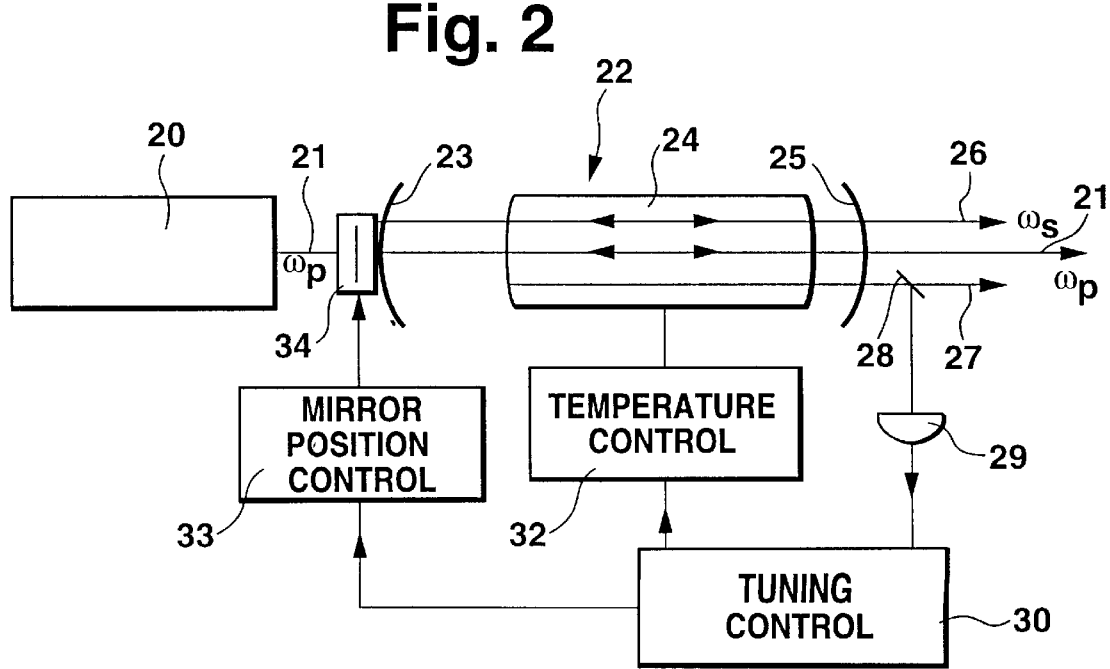
FIG. 2 shows a system for feedback cavity length control and temperature control either based on a comparison between a reference frequency and the idler beam frequency or for synchronous tuning of cavity length and temperature of the medium.

FIG. 2 shows an alternative embodiment of the SRO system in accordance with the invention comprising a pump source 20 producing a pump wave 21. In this embodiment, means for controlling the frequency of the pump wave 21 are intrinsically located within pump source 20. The pump wave 21 passes into a SRO system 22 comprising a first reflector 23, a second reflector 25 and a nonlinear medium 24. The pump wave 21 enters into the nonlinear medium 24 to generate a signal wave 26 as well as an idler wave 27. The idler wave 27 is essentially transmitted through second reflector 25 to be externally available for further spectrographic use while signal wave 26 passes it in part. In the embodiment of FIG. 2, stabilization and/or optimization of the system is effected through monitoring of the idler wave 28. A portion of the idler wave is reflected by mirror 28 to detector system 29 including signal processor means. The resulting output of the detector signal processor 29 is fed to a tuning control system 30. The detector system 29 could be a power monitor, in which case the temperature control changes the medium's temperature when the tuning control changes the length of the cavity to tune the output frequencies of waves 26, 27. The temperature of medium 24 is regulated to maximize the detected power. The detector 29 could also contain an external frequency reference such as a stable optical cavity, atomic ensemble or the like representing a constant frequency. The information concerning the detuning between reference and idler frequency is evaluated in tuning controller 30. The tuning controller 30 thereby outputs signals to temperature controller 32 and mirror position controller 33 respectively. The mirror control system 33 feeds back the control signal to a positioner 34 to adjust the length of the cavity. Such adjustments can be performed with short time constants for rapid response to detuning. The temperature control system 32 can provide for longer term, slower changes in the operating conditions of the system.

Figure 3:
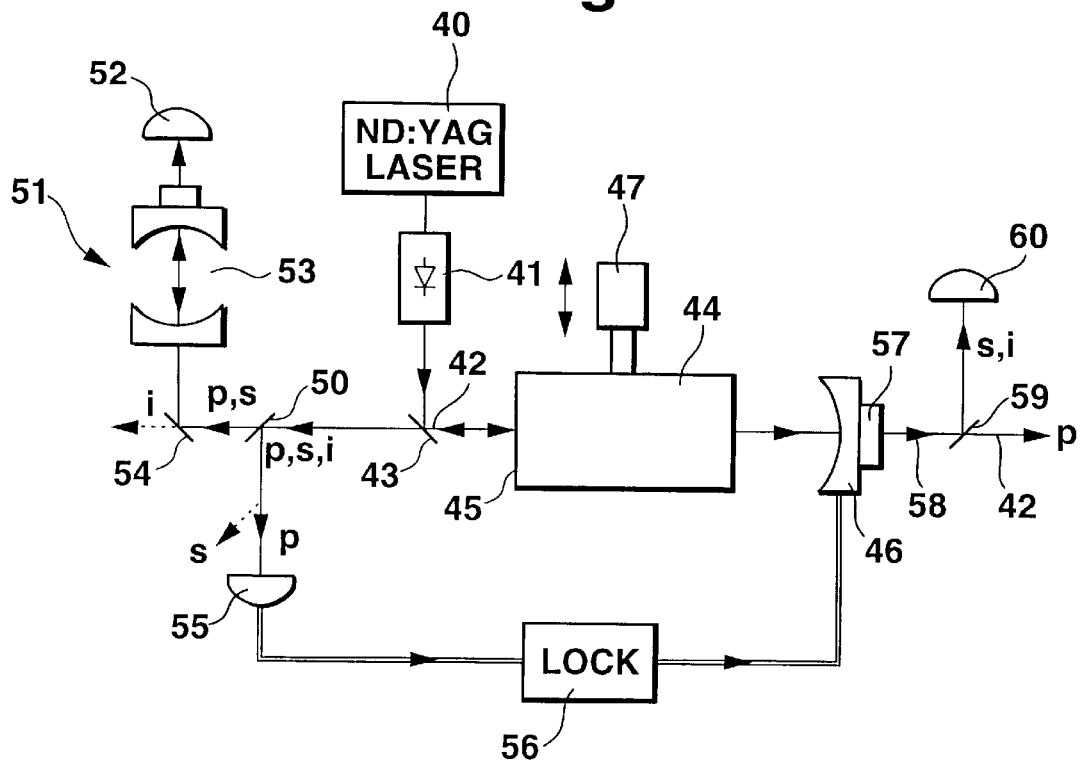
FIG. 3 shows a preferred embodiment of the system involving a multigrating as nonlinear medium which can be displaced with a translator.

A particularly preferred embodiment is shown in FIG. 3. In the embodiment according to FIG. 3, a pump source 40, comprising a Nd:YAG laser, outputs a pump wave 42 into a Faraday isolator 41. In this embodiment, means for controlling the frequency of the laser 40 are intrinsically located therein. The output from the Faraday isolator 41 is incident on dichroic mirror 43 and enters into a PPLN chip (periodically-poled lithium niobate). Translator means 47 can be used to move PPLN chip 44 from one grating to another. The PPLN chip 44, in response to the pump wave 42, generates signal and idler waves. The cavity is resonant only for the pump and signal waves, which are reflected from mirror 45 as well as mirror 46. The optical properties of the system and, in particular of the pump and signal waves, can be monitored in an external spectral analyzer 51. The pump, signal, and idler waves pass through beam spitter 50 to be incident on reflector 54 and into a Fabry-Perot interferometer 53 comprising an external detector 52. Measurement of the output characteristics and power of the signal and idler waves exiting as output beams 58, can be monitored by means of a dichroic mirror 59 directing signal and idler waves onto thermopile 60. The stability of the system in the embodiment of FIG. 3 is maintained by monitoring the reflected pump wave 42 exiting out of the oscillator and feeding same from the beam splitter 50 onto a detector 55. Means can be provided for branching off the signal wave from the pump wave prior to the detector 55 as schematically indicated in FIG. 3. Detector 55 signals lock 56 which communicates with piezo 57 to stabilize the length of the cavity.

In a particular configuration of the embodiment of FIG. 3 a diode pumped miniature Nd:YAG ring laser is used, having a single frequency output power of 800 mW at 1064 nm with a linewidth of 1 Kilohertz and continuous tunability of 10 GHz. The SRO comprises fundamental reflector elements 45, PPLN multigrating chip 44 and external reflector 46 and is a single cavity resonant system configured as a semi-monolithic linear standing wave resonator. The external mirror 46 is separated by 16 mm from the chip 44 and the PPLN crystal 44 has the dimensions of 19 mm×11 mm×0.5 mm with eight different gratings having periodicity lengths varying from 30 to 31.2 $\mu$m. One of the plane chip end faces 45 is coated with a broad-band dichroic mirror providing reflectivities of 92% for the pump (1064 nm) and average values of 99.7% for the signal (1.66–2 $\mu$m) and 3% for the idler (2.3–3 $\mu$m). An anti-reflection coating with residual reflectivities of 0.3%, 0.8% and 3% at the pump, signal, and idler waves respectively, is deposited on the other chip face. The external mirror 46 has a 25 mm radius-of-curvature and is mounted to a piezo transducer 57. The TEM$_{00}$ cavity mode has a waist of 29 $\mu$m providing optimal nonlinear coupling for the given resonator geometry and crystal length. The pump was spatially mode matched to the fundamental resonator mode with an efficiency of 98%. The reflectivities of the external mirror at the pump, signal, and idler waves are 99.7%, 99.8% and 5% respectively on the curved surface, whereas the back face is uncoated. The total round-trip losses for the pump, signal, and idler waves are $A_p$=10%, $A_s$=2.5% and $A_i$=99.9% respectively. The last value ensures singly-resonant operation. For an SRO cavity that is highly transmitting for the idler wave at both mirrors, an internal threshold power $P_{th}^{int}=A_s/2E_{NL}$=8.6 W is estimated, with a calculated single-path nonlinearity $E_{NL}$ of 1.45/kW, assuming an effective nonlinear coefficient $d_{eff}$=15 pm/V (first order quasi-phase matching). A pump power enhancement of 32 is deduced from a measured finesse of 63 and an incoupling of 65% for the pump wave below threshold.

Particularly good stabilization of the pump wave is achieved by locking the cavity length on resonance with the laser frequency. This is done through frequency modulation of the pump wave by modulating the laser crystal piezo-electrically with a 10 MHz signal (50 mV peak-to-peak voltage). The pump wave reflected from the SRO cavity is detected with a sensitive InGaAs photodiode to obtain an error signal through mixing the AC detector signal with the modulation frequency and by subsequent low-pass filtering. This error signal is input to the piezo to shift the external cavity mirror using a proportional integral servo controller. Use of the reflected light for stabilization is important since the transmitted pump wave undergoes optical limiting above threshold to cause an error signal which does not allow for stabilization of the reflected light at zero detuning. The pump wave remained stably locked for more than 50 h with less than 2% power fluctuations. A minimum external threshold power $P_{th}^{ext}$=260 mW results at a signal wavelength of 1.7 $\mu$m. This corresponds to an internal pump wave power of 8.3 W.

Further description of the embodiment of FIG. 3 can be found in Opt. Lett., volume 22, number 17, p. 1293–1295, (1997), the complete disclosure of which is hereby incorporated by reference.

Figure 4A:
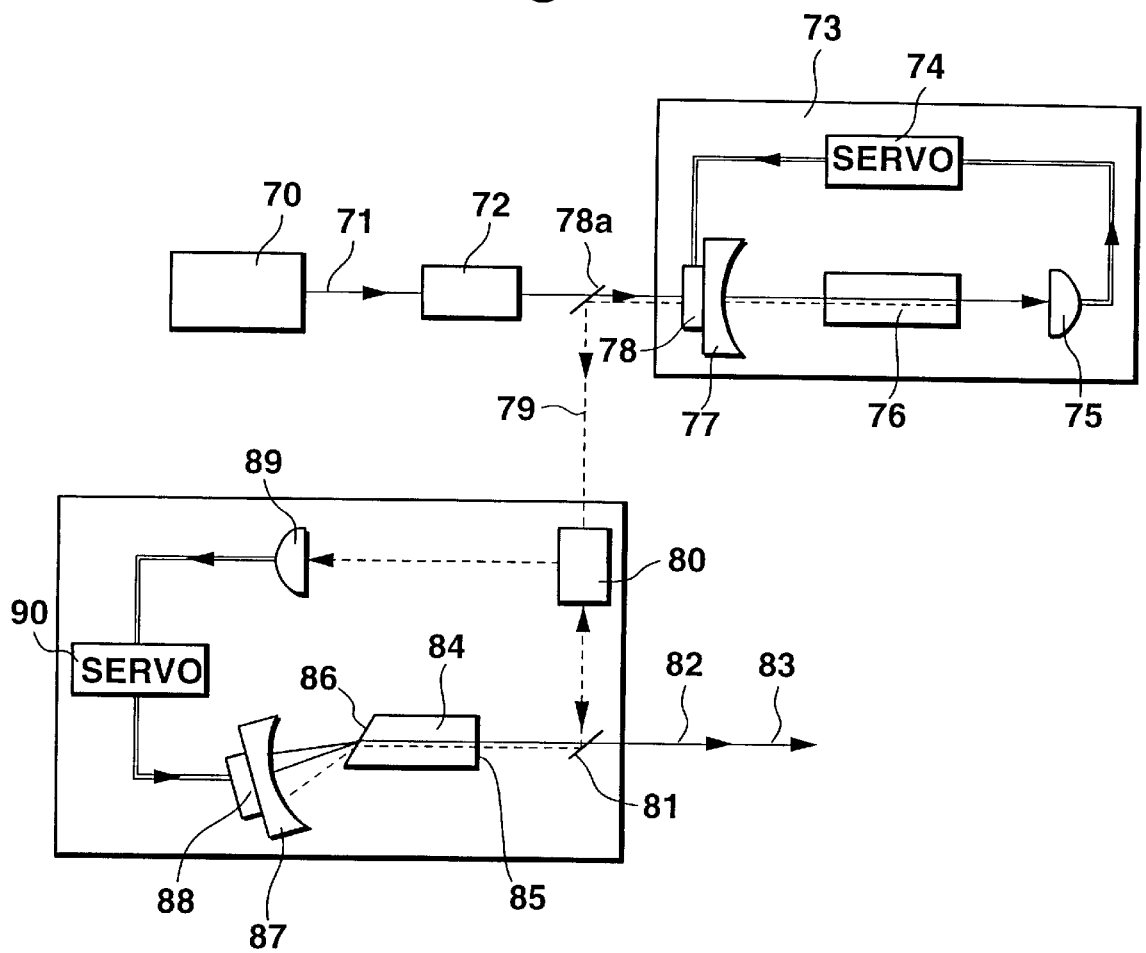
FIG. 4a shows an alternative embodiment of the invention involving a nonlinear medium having a Brewster angle cut and an external concave mirror.

FIG. 4a shows another preferred embodiment in accordance with the invention comprising a pump source 70 generating a laser beam 71. The laser beam 71 from the pump source 70 is fed through an optical isolator 72 and is incident on a second harmonic generator 73. The second harmonic generator 73 comprising a nonlinear crystal 76, mirror 77, detector 75, servo 74 and piezo 78 to frequency-double the incident laser beam. The output of the second harmonic generator 73 is incident upon a dichroic mirror 78a and reflected in the form of pump wave 79 onto isolator 80. The pump wave 79 passing through isolator 80 is incident upon dichroic mirror 81 and passed into a nonlinear medium 84. The nonlinear medium 84 has a reflecting surface 85 at one end and a Brewster surface 86 at the other end. The beam fractions passing out of the Brewster surface 86 are split into three portions corresponding to the pump wave, the idler wave and the signal wave and are incident upon external mirror 87. External mirror 87 has a radius-of-curvature equal to the distance between its reflecting surface and the exit point out of the Brewster surface 86 to refocus the split beams back into the nonlinear medium 84. The beams travel colinearly and coincidently within the nonlinear medium 84. Reflecting surface 85 can be structured to focus the beams within the medium 84. A second portion of the pump wave 79 is passed to detector 89 for generating a signal for servo 90 to control piezo 88 and the resonant length of the oscillator system. The output beam from the system is passed through dichroic mirror 81 and is externally available as signal wave 82 and idler wave 83.

Figure 4B:
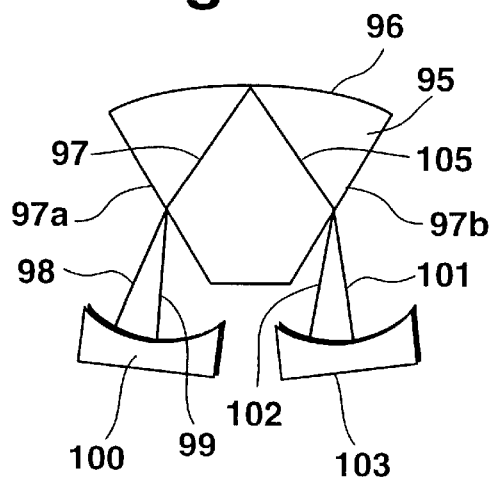
FIG. 4b shows an embodiment of the system of FIG. 4a in which the nonlinear medium exhibits two Brewster angle cuts and the system comprises two external concave mirrors.

An alternative embodiment of the nonlinear Brewster angle medium of FIG. 4a is given in FIG. 4b. In the embodiment of FIG. 4b, nonlinear medium 95 is fashioned with a focussing element surface 96. Internal beams 97 and 105 are incident on Brewster surfaces 97a and 97b respectively. The idler and signal waves are split into two waves 98, 99, after passage through the first Brewster surface 97a, and are incident upon reflecting mirror 100. The reflecting mirror 100 has a radius-of-curvature equal to the distance between the output point at the external Brewster surface 97a and the mirror surface to refocus first 98 and second 99 external beams back into the nonlinear medium 95. The second portion of the beam 105 exits out of the nonlinear medium 95 through second Brewster surface 97b, is split into third and fourth beams 101, 102 and is incident upon a second concave mirror 103. Like mirror 100, mirror 103 has a radius-of-curvature equal to its separation from the exit point of the two beams 101, 102 out of the Brewster surface 97b to refocus the beams 101, 102 back into the nonlinear medium 95.

In a particular embodiment of FIG. 4a, a miniature Nd:YAG ring laser 70 is used as a primary source of the system, delivering a maximum output power of 1.5 Watt at 1064 nm with a linewidth of 1 kHz and a frequency instability of about 10 MHz/h. The laser frequency is continuously tuned through 10 GHz by temperature control of the Nd:YAG crystal. The laser beam 71 is frequency-doubled in the external resonator 73 to produce a maximum output power of 1.1 Watt at 532 nm. The SRO is a standing wave monolithic cavity containing a 7.5 mm long MgO:LiNbO$_3$ crystal 84 (type-I phase matching). The cavity design is adapted to provide low loss for the p-polarized signal wave and good overlap of signal, idler, and pump waves within the crystal 84 over a wide tuning range. The first property is implemented by using a crystal cut at Brewsters angle (65.9°) for the center signal wavelength. The transmission loss for the signal wave remains low over a relatively wide tuning range. The dispersion change of signal, idler, and pump waves is compensated by means of an external cavity mirror 87 placed at a distance equal to its radius-of-curvature of 25 mm from the exit point on the Brewster face 86. In this fashion, waves exiting at any angle are retroreflected to assure colinear propagation and good overlap of the three waves inside the crystal 84. This geometry requires a focussing mirror 85 at the other end of the crystal 84 to obtain a stable resonator mode for pump and signal. The crystal 84 can be configured with a 10 mm spherically polished end face which is dielectrically coated with average reflectivities of 92%, 99.5%, 2% for the pump, signal, and idler waves respectively. The range where the reflectivity drops from 98% to 5% extends from 1040 to 1085 nm. The external mirror 87, mounted on a PZT 88 for cavity length locking, provides average reflectivities of 98% for the pump, 99% for the signal and 90% for the idler. A simple AR-coating is added to the Brewster face 86 to reduce pump wave losses. SRO operation is ensured by a total round-trip power loss of more than 98% for the idler wave. The pump waist is 18 μm leading to a calculated single pass nonlinearity $E_{NL}$=1.5/kW. (An effective nonlinear coefficient $d_{eff}$=4.7 pm/V has been assumed.) The expected internal threshold for the SRO with double-passed idler is $P_{th}=A_S/4E_{NL}$=3.3 W for a round trip signal loss $A_s$=2%. The expected external threshold is reduced to 0.15 W by the pump wave enhancement factor measured to be 22. Oscillation occurred at pump powers above 200 mW and stable operation was ensured by locking the cavity length on resonance with the pump frequency and a pump wave phase is modulated within the nonlinear crystal 84. Since the transmitted pump wave undergoes optical limiting, the reflected pump light is used to generate an appropriate error signal to lock on zero detuning of the pump wave. A maximum total conversion efficiency to signal plus idler of 33% is obtained at an input pump power of 300 mW.

Further disclosure of this particular embodiment can be found in Appl. Phys. B 65, 775–777 (1997), the complete disclosure of which is hereby incorporated by reference.

Figure 5:
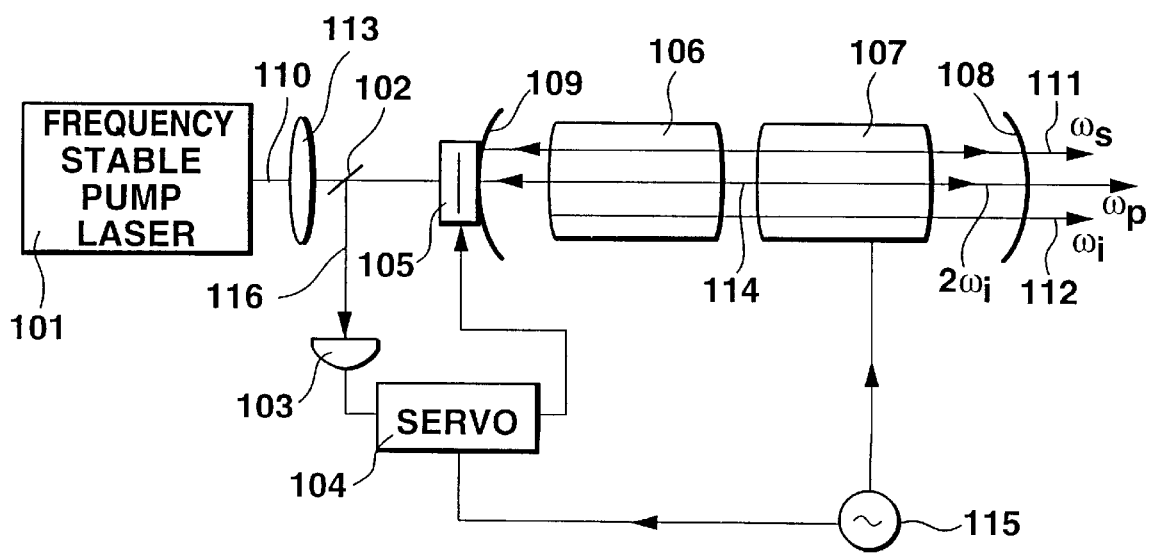
FIG. 5 shows an embodiment of a resonator with internal SHG and active cavity length stabilization.

FIG. 5 shows a system in accordance with the invention, wherein a frequency-stable pump source 101 emits a pump wave which is focused by lens 113 into the resonator. The pump wave is essentially transmitted by both mirrors 109 and 108 and thus does not resonate in the resonator. Signal wave 111 and idler wave 112 are generated in medium 106, wherein the idler 112 is essentially transmitted through mirror 108. In a second nonlinear medium 107, the second harmonic 114 of the idler wave is generated and resonantly enhanced between the mirrors 108 and 109 which have high reflectivity for the wavelength corresponding to wave 114. The portion of wave 114 transmitted through mirror 109 and travelling back toward the pump source is reflected by dichroic mirror 102 and detected at detector 103. The phase modulation produced by the radiofrequency source 115 that electro-optically modulates medium 107 is converted into amplitude modulation on wave 116 if wave 114 exhibits a detuning with respect to the cavity resonance. The amplitude modulation is converted into an error signal in servo system 104 which, after amplification, is fed to the actuator 105 which moves mirror 109 to keep the wave 114 in resonance. The frequency-stability of the emitted waves 111, 112 is thereby enhanced.

We claim:

1. An optical parametric oscillator system for use in a continuous-wave pumped laser device having a single-frequency pump source, the system comprising:
   a single resonance resonator having a nonlinear medium for producing a first parametrically generated wave and a second parametrically generated wave in response to a pump wave from the single-frequency pump source, said resonator having low loss for said first parametrically generated wave and high transmission for said second parametrically generated wave; and
   means for limiting temporal variations of independent parameters influencing an optical path length of said resonator and a wavevector mismatch of parametric generation to a level substantially smaller than that which would lead to a change in wave vector mismatch comparable to a difference of wavevector mismatches corresponding to frequencies of said first parametrically generated wave spaced by one free spectral range of said resonator.

2. The system of claim 1, wherein said resonator is a monolithic block.

3. The system of claim 1, wherein said nonlinear medium comprises a quasi-phasematched crystal.

4. The system of claim 1, wherein said resonator has high transmission for said pump wave and said independent parameters comprise a pump wave frequency, a temperature of said nonlinear medium, and a round-trip optical path length of said first parametrically generated wave external to said nonlinear medium.

5. The system of claim 1, wherein said resonator has high transmission for said pump wave, an electro-optic medium is disposed within said resonator, and said limiting means comprise means for applying an electric field to said medium, wherein said independent parameters comprise a pump frequency, a temperature of said nonlinear medium, said electric field, and a part of a round-trip optical path length of said first parametrically generated wave external to said nonlinear medium.

6. The system of claim 1, wherein said resonator comprises mirrors for said first and said second parametrically generated waves and said pump wave, said resonator has low loss for said pump wave, said pump wave is resonantly enhanced between said mirrors, and said limiting means comprise means for maximizing a circulating pump power through control of a pump frequency.

7. The system of claim 1, wherein said resonator comprises mirrors for said first and said second parametrically generated waves and said pump wave, said resonator has low loss for said pump wave and said pump wave is resonantly enhanced between said mirrors, wherein said limiting means comprise means for controlling an optical path length of said resonator to maximize a circulating pump power.

8. The system of claim 6, wherein a transmission of an input coupling mirror for said pump wave is optimized for maximum power conversion to one of said first and said said second parametrically generated waves.

9. The system of claim 7, wherein a transmission of an input coupling mirror for said pump wave is optimized for maximum power conversion to one of said first and said second generated waves.

10. The system of claim 1, wherein said limiting means comprise means for controlling an optical path length of said resonator, means for changing an optical path length by a controlled amount, and means for adjusting a phase mismatch of said resonator in response to a change in said optical path length to maximize a power conversion efficiency of the system.

11. The system of claim 1, further comprising a frequency-stable reference, means for comparing a frequency of one of said first and said second parametrically generated waves with said reference, and means for adjusting said frequency of one of said waves to minimize a detuning between said frequency and said reference.

12. The system of claim 11, wherein said resonator comprises mirrors having high reflectivity at a wavelength of a probe wave circulating in said resonator, and said limiting means comprise means for detection of a detuning of said probe wave from resonance and means for minimizing said detuning of said probe wave by one of controlling said frequency of said pump wave and controlling an optical path length of said resonator.

13. The system of claim 12, wherein said probe wave is generated as a second harmonic of one of said pump wave, said first and said second parametrically generated waves.

14. The system of claim 12, wherein said probe wave is obtained by selecting a part of said first wave emitted from said resonator and sending said selected part into said resonator, and further comprising means to rotate polarization of said selected part before entering said resonator.

15. The system of claim 1, wherein said resonator consists essentially of a semi-monolithic resonator comprising a quasi-phasematched multigrating medium, an external concave mirror having a mirror coating on a curved surface thereof, wherein a first end face of said multigrating medium is flat and has a mirror coating and a second end face of said medium has an anti-reflection coating, and further comprising means to translate said medium.

16. The system of claim 15, wherein said mirror coating on said first end face has different spectral reflectivity properties on different gratings.

17. The system of claim 15, wherein said anti-reflection coating has different spectral reflectivity properties on different gratings.

18. The system of claim 1, wherein said resonator consists essentially of a Brewster-angle cut resonator comprising at least one external concave mirror having a radius of curvature equal to a distance between an exit point out of a Brewster-angle surface of said nonlinear medium and a curved reflecting surface of said external concave mirror, wherein said nonlinear medium has at least one Brewster-angle surface to minimize Fresnel-reflection losses for waves having a polarization vector parallel to a plane of incidence with waves of different wavelength propagating colinearly within said nonlinear medium, further comprising means for focussing within said nonlinear medium.

19. The system of claim 18, wherein said focussing means consists essentially of a curved surface having a mirror coating.

20. The system of claim 18, wherein said focussing means consists essentially of a curved surface having total internal reflection.

* * * * *